(12) United States Patent
Braun et al.

(10) Patent No.: US 11,420,740 B2
(45) Date of Patent: Aug. 23, 2022

(54) DEVICE FOR THE AUTOMATED CHARGING AND DISCHARGING OF A FREE-FLYING AUTONOMOUSLY CONTROLLED DRONE

(71) Applicant: Daimler AG, Stuttgart (DE)

(72) Inventors: Marcel Braun, Ilsfeld (DE); Uwe Habisreitinger, Freudenstadt (DE)

(73) Assignee: Daimler AG, Stuttgart (DE)

( * ) Notice: Subject to any disclaimer, the term of this patent is extended or adjusted under 35 U.S.C. 154(b) by 840 days.

(21) Appl. No.: 16/330,736

(22) PCT Filed: Sep. 5, 2017

(86) PCT No.: PCT/EP2017/001050
§ 371 (c)(1),
(2) Date: Mar. 5, 2019

(87) PCT Pub. No.: WO2018/046125
PCT Pub. Date: Mar. 15, 2018

(65) Prior Publication Data
US 2022/0119103 A1   Apr. 21, 2022

(30) Foreign Application Priority Data
Sep. 6, 2016   (DE) ............... 10 2016 010 685.9

(51) Int. Cl.
*B64C 39/02* (2006.01)
*B60P 3/00* (2006.01)
(Continued)

(52) U.S. Cl.
CPC .......... *B64C 39/024* (2013.01); *B25J 9/1687* (2013.01); *B60P 3/007* (2013.01); *B60P 3/11* (2013.01);
(Continued)

(58) Field of Classification Search
CPC ............ B64C 39/024; B64C 2201/128; B64C 2201/208; B25J 9/1687; B60P 3/007;
(Continued)

(56) References Cited

U.S. PATENT DOCUMENTS 9,139,310 B1 *   9/2015   Wang .................... B64C 39/024
9,305,280 B1 *   4/2016   Berg ........................ B64D 5/00
(Continued)

FOREIGN PATENT DOCUMENTS

DE   10 2014 112 180 B3   4/2015
DE   10 2014 105 583 A1   10/2015
(Continued)

OTHER PUBLICATIONS

PCT/EP2017/001050, International Search Report dated Mar. 29, 2018 (Two (2) pages).
(Continued)

*Primary Examiner* — Richard M Camby
(74) *Attorney, Agent, or Firm* — Crowell & Moring LLP

(57) ABSTRACT

A device for the automated charging and discharging of an object on a free-flying autonomously controlled drone includes a landing platform for the drone, a storage device for storing objects, a robot where the robot is configured to remove an object from the storage apparatus in an automated manner and to provide the object on the landing platform to be picked up by the drone and is configured to pick up in an automated manner an object that is provided on the landing platform by the drone and to deposit the object in the storage apparatus, and a controller where the robot is controllable by the controller.

10 Claims, 1 Drawing Sheet

(51) Int. Cl.
*B64F 1/32* (2006.01)
*B60P 3/11* (2006.01)
*B64D 1/08* (2006.01)
*B64F 1/00* (2006.01)
*B25J 9/16* (2006.01)
*B64D 1/22* (2006.01)

(52) U.S. Cl.
CPC ............. *B64D 1/08* (2013.01); *B64D 1/22* (2013.01); *B64F 1/007* (2013.01); *B64F 1/32* (2013.01); *B64C 2201/128* (2013.01); *B64C 2201/208* (2013.01)

(58) Field of Classification Search
CPC ..... B60P 3/11; B64D 1/08; B64D 1/22; B64F 1/007; B64F 1/32
See application file for complete search history.

(56) References Cited

U.S. PATENT DOCUMENTS

| | | | |
|---|---|---|---|
| 9,348,333 | B1 | 5/2016 | Buchmueller et al. |
| 2015/0352721 | A1 | 12/2015 | Wicks et al. |
| 2016/0039300 | A1* | 2/2016 | Wang ..................... B64F 1/007 244/58 |
| 2016/0107750 | A1* | 4/2016 | Yates ................... B64C 39/024 244/2 |

FOREIGN PATENT DOCUMENTS

| | | |
|---|---|---|
| DE | 10 2015 104 052 A1 | 10/2015 |
| DE | 10 2014 112 480 A1 | 3/2016 |
| JP | 2016-153337 A | 8/2016 |
| WO | WO 2014/080389 A2 | 5/2014 |
| WO | WO 2017/079587 A1 | 5/2017 |

OTHER PUBLICATIONS

Thomas Robinette, "HorseFly 'Octocopter' Primed to Fly the Future to Your Front Door", Jun. 4, 2014, pp. 1-7, URL: https://www.uc.edu/news/articles/legacy/enews/2014/06/e19929.html.
German Search Report issued in German counterpart application No. 10 2016 010 685.9 dated Jun. 6, 2017, with Statement of Relevancy (Nine (9) pages).
German-language German Office Action issued in German counterpart application No. 10 2016 010 685.9 dated Sep. 26, 2019 (Six (6) pages).

* cited by examiner

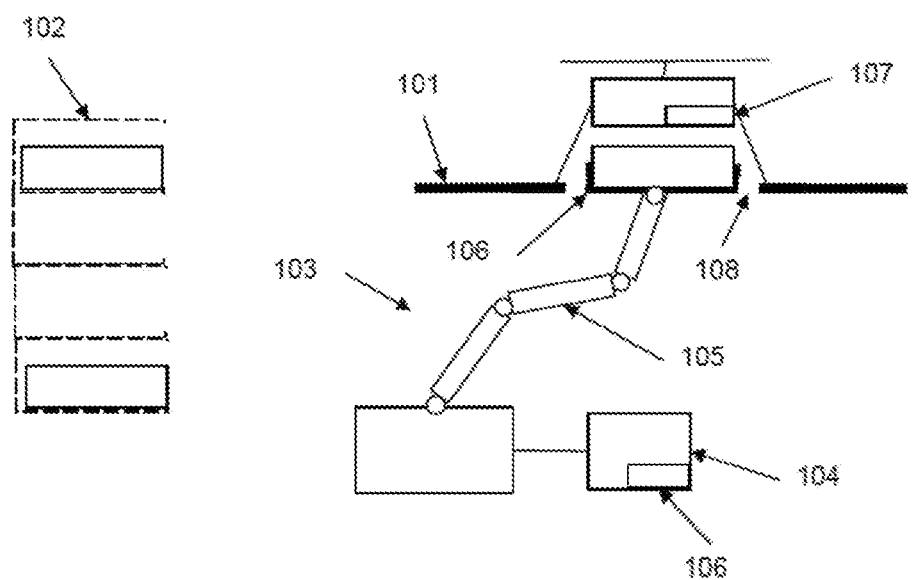

DEVICE FOR THE AUTOMATED CHARGING AND DISCHARGING OF A FREE-FLYING AUTONOMOUSLY CONTROLLED DRONE

BACKGROUND AND SUMMARY OF THE INVENTION

The invention relates to a device for the automated loading and unloading of a free-flying autonomously controlled drone and to a vehicle, in particular a delivery vehicle, comprising such a device. The invention can be used in particular in the postal and parcel service and in the transport and delivery industry.

Drones of this kind are currently loaded and unloaded manually by operators. Disadvantages include the time expended for this purpose and the large spaces required for this purpose to ensure an appropriate freedom of movement for the operator.

The object of the invention is to provide a device that allows a free-flying autonomously controlled drone to be loaded and unloaded in a time-efficient manner, with the spatial requirements for the loading and unloading being reduced in comparison with the prior art.

The object is achieved by means of a device for the automated loading and unloading of an object to/from a free-flying autonomously controlled drone. The proposed device comprises a landing platform for the drone, a storage apparatus for storing objects, a robot which is designed and configured to remove objects from the storage apparatus in an automated manner and to provide the objects on the landing platform to be picked up by a drone, and to pick up, in an automated manner, objects that are provided on the landing platform by a drone, and to deposit the objects in the storage apparatus, and a controller for controlling the robot.

Advantageously, the robot has a multi-link robotic manipulator that has, at the distal end thereof, an effector for picking up and holding objects. The effector is preferably a gripper. Of course, all other currently known devices that are suitable for picking up and holding objects are included in the concept of the invention.

The links of the robotic manipulator are advantageously interconnected via actuator-driven rotary joints and/or via linear joints. The robot, the landing platform and the storage apparatus are arranged relative to one another in such a way that the effector can, in the 3D workspace thereof, pick up objects that are stored in the storage apparatus and provide the objects on the landing platform. The term "3D workspace" defines in this case all three-dimensional positions that the effector can reach.

Advantageously, a rotary joint allows rotation of the links connected to the rotary joint about an axis of rotation. In an advantageous development of the robotic manipulator, two links and an effector are provided which are interconnected in series via three linear joints and connected to a robot base, the linear joints each allowing movement along a movement axis and the three movement axes being perpendicular to one another.

Advantageously, one or more of the linear joints provided on the robotic manipulator have a rigid-chain drive or a spindle drive.

The robot advantageously has a device for securing an object during the transport thereof from the storage apparatus to the landing platform and vice versa.

One advantageous development of the proposed device is characterized in that the landing platform has an opening at an intended landing position of the drone and the robot is designed to provide, from below through the opening in the landing platform, objects for collection by a drone, and to pick up objects from a drone and deposit the objects into the storage apparatus. Advantageously, the opening can be closed. The landing platform advantageously has a sufficient surface accuracy such that a drone that has landed thereon, as far as possible, does not slip out of position, even under the influence of wind.

An object can be transferred from the effector to the drone or from the drone to the effector in different ways. For example, the effector can grip an object that is still secured to the drone, in which case a signal is sent from the robot to the drone which prompts the drone to release the object. In another embodiment, the effector has a flat surface that is preferably oriented so as to be level with the surface of the landing platform. After the drone has landed centrally over the flat surface, it releases the transported object in this embodiment such that the object comes to rest on the flat surface and can be secured there by the effector in order to be deposited in the storage apparatus.

One advantageous development of the proposed device is characterized in that the controller of the robot has a communication means for data exchange with a control unit of the drone, and the controller controls the robot on the basis of data of the control unit of the drone. Advantageously, the control unit of the drone is designed to transmit at least the following two messages to the controller of the robot: "drone landed and ready to dispense a transported object", "drone landed and ready to pick up a transported object". Advantageously, messages initiate the relevant transfer process of the robot. Advantageously, additional messages are exchanged between the controller and the control unit during the transfer process.

Advantageously, the arrival time of the drone at the landing platform is transmitted to the controller of the robot, in particular during the approach of a drone to the landing platform for collecting a specific object from the storage apparatus, such that the robot can provide the relevant object in time for the arrival of the drone at the landing platform.

The device further advantageously comprises an apparatus for scanning a half-space above the landing platform for existing obstacles. The apparatus preferably comprises a 3D laser scanner, a 3D camera, a radar scanner, an ultrasonic scanner, an infrared scanner or a combination thereof. The data recorded by the apparatus are advantageously analyzed in the apparatus and obstacle data are generated. The obstacle data advantageously indicate spatial regions in which obstacles are present, around a reference point of the landing platform. Advantageously, the obstacle data are transmitted to the control unit of the drone and taken into account by the control unit in the flight guidance of the drone.

Further preferably, the device comprises a transmitter for sending locating and/or flight guidance signals which are used for precise flight guidance of the drone to a predefined landing spot on the landing platform, are received by the drone and taken into account by the control unit in the flight guidance of the drone. The signals sent by the transmitter are advantageously electromagnetic signals, acoustic signals, light signals or a combination thereof.

A further aspect of the invention relates to a vehicle, in particular a delivery vehicle, comprising a device as described above.

In one embodiment of the proposed vehicle, the landing platform is arranged on a roof of the vehicle. In this case, the landing platform advantageously does not project beyond the outline of the roof of the vehicle. The landing platform advantageously has a central opening which can be closed. The robot and the storage apparatus are advantageously integrated in a loading space structure of the vehicle. Advantageously, the storage apparatus comprises one or more sets of shelves. Advantageously, one set of shelves is arranged in each case on the right-hand inner wall and the left-hand inner wall of the loading space structure. Advantageously, the sets of shelves can be easily removed or reinserted by means of a mechanism in the vehicle. Advantageously, the robot is arranged in a central passage between two sets of shelves arranged on the lateral walls in the loading space structure.

Further advantages, features and details can be found in the following description in which, with reference to the drawing where appropriate, at least one embodiment is described in detail. Identical, similar and/or functionally identical parts are provided with the same reference signs.

BRIEF DESCRIPTION OF THE DRAWINGS

The FIGURE is a schematic representation of a proposed device.

DETAILED DESCRIPTION OF THE DRAWINGS

The FIGURE is a schematic representation of a proposed device for loading and unloading an object to/from a free-flying autonomously controlled drone.

The device comprises a landing platform 101 for the drone, a storage apparatus 102 for storing objects, a robot 103 which is designed and configured to remove objects from the storage apparatus 102 in an automated manner and to provide the objects on the landing platform 101 to be picked up by a drone, and to pick up, in an automated manner, objects that are provided on the landing platform 101 by a drone, and to deposit the objects in the storage apparatus 102, and a controller 104 for controlling the robot 103. The storage apparatus 102 in this case is designed as a set of shelves and has, in the cross section shown, an object in the bottom shelf and in the top shelf.

The loading platform 101 has an opening 108 through which the effector provides, from below, an object to be picked up by the drone. The drone in this case has landed on the platform in such a way that the landing legs thereof stand on the platform and the drone body can be freely accessed from below by the effector in order to transfer the object from the effector.

The robot 103 in this case comprises a three-link robotic manipulator 105 that has, at the distal end thereof, an effector 106 for picking up and holding objects. The robotic manipulator 105 is connected, at the proximal end thereof, to a robot base. Actuator-driven rotary joints are provided in this case for connecting the links and the effector to the robot base. The control of the associated actuators is carried out by the controller 104. The controller 104 furthermore has a communication means 106 for data exchange with a control unit 107 of the drone, the controller 104 controlling the robot 103 on the basis of data of the control unit 107 of the drone.

Although the invention has been illustrated and explained in detail by preferred embodiments, the invention is not limited by the disclosed examples and other variations may be derived by a person skilled in the art without departing from the scope of protection of the invention. It is therefore clear that a plurality of possible variations exist. It is likewise clear that exemplary embodiments are indeed merely examples that are in no way to be construed as a limitation of, for example, the scope of protection, the possible uses or the configuration of the invention. Rather, the foregoing description and the description of the drawing make it possible for a person skilled in the art to specifically implement the exemplary embodiments and, in the knowledge of the disclosed concept of the invention, a person skilled in the art may perform a variety of modifications, for example with respect to the function or the arrangement of individual elements specified in an exemplary embodiment, without departing from the scope of protection defined by the claims and the legal equivalents thereof, for example the broader explanations in the description.

The invention claimed is:

1. A vehicle, comprising:
    a device for automated loading of objects to a free-flying autonomously controlled drone and for unloading of objects from the free-flying autonomously controlled drone, wherein the device includes:
        a landing platform for the drone;
        a storage apparatus;
        a robot, wherein the robot is configured to:
            remove a first object from the storage apparatus in an automated manner and to provide the first object on the landing platform to be picked up by the drone;
            pick up in an automated manner a second object that is provided on the landing platform by the drone and to deposit the second object in the storage apparatus; and
        a controller, wherein the robot is controllable by the controller.

2. The vehicle according to claim 1, wherein the vehicle is a delivery vehicle.

3. The vehicle according to claim 1, wherein the robot has a multi-link robotic manipulator that has, at a distal end of the multi-link robotic manipulator, an effector for picking up and holding objects.

4. The vehicle according to claim 3, wherein links of the multi-link robotic manipulator are interconnected via a respective actuator-driven rotary joint and/or via a respective linear joint.

5. The vehicle according to claim 4, wherein the linear joint has a rigid-chain drive.

6. The vehicle according to claim 1, wherein the landing platform has an opening at an intended landing position of the drone and wherein the robot is configured to provide, from below through the opening in the landing platform, objects for collection by the drone and is configured to pick up objects from the drone and to deposit the picked up objects into the storage apparatus.

7. The vehicle according to claim 1, wherein the robot has a device for securing an object during a transport of the object.

8. The vehicle according to claim 1, wherein the controller has a communication device for data exchange with a control unit of the drone and wherein the controller controls the robot on a basis of data received from the control unit of the drone.

9. The vehicle according to claim 8, wherein the data received from the control unit of the drone includes a first message that the drone has landed and is ready to dispense an object or a second message that the drone has landed and is ready to pick up an object.

10. The vehicle according to claim 1, wherein the landing platform is disposed on a roof of the vehicle.

* * * * *